United States Patent
Lee et al.

(10) Patent No.: US 11,038,242 B2
(45) Date of Patent: Jun. 15, 2021

(54) ELECTRODE ASSEMBLY AND METHOD FOR MANUFACTURING THE SAME

(71) Applicant: LG Chem, Ltd., Seoul (KR)

(72) Inventors: Sang Kyun Lee, Daejeon (KR); Cha Hun Ku, Daejeon (KR); Sang Hun Kim, Daejeon (KR); Tae Kyu Kim, Daejeon (KR); Min Cheol Choi, Daejeon (KR)

(73) Assignee: LG Chem, Ltd.

( * ) Notice: Subject to any disclaimer, the term of this patent is extended or adjusted under 35 U.S.C. 154(b) by 88 days.

(21) Appl. No.: 16/678,462

(22) Filed: Nov. 8, 2019

(65) Prior Publication Data

US 2020/0075909 A1     Mar. 5, 2020

Related U.S. Application Data

(62) Division of application No. 15/549,546, filed as application No. PCT/KR2016/007265 on Jul. 5, 2016, now Pat. No. 10,505,170.

(30) Foreign Application Priority Data

Jul. 10, 2015  (KR) .................. 10-2015-0098563

(51) Int. Cl.
*H01M 50/46* (2021.01)
*H01M 10/04* (2006.01)
*H01M 50/403* (2021.01)

(52) U.S. Cl.
CPC ..... *H01M 50/461* (2021.01); *H01M 10/0431* (2013.01); *H01M 50/403* (2021.01); *H01M 2220/30* (2013.01)

(58) Field of Classification Search
CPC ...... H01M 2/00; H01M 2/168; H01M 50/461; H01M 50/403; H01M 10/0431
See application file for complete search history.

(56) References Cited

U.S. PATENT DOCUMENTS

| 6,465,125 | B1 | 10/2002 | Takami et al. |
| 2005/0100794 | A1 | 5/2005 | Chamberlain et al. |
| 2007/0020524 | A1 | 1/2007 | Kim et al. |
| 2014/0178740 | A1 | 6/2014 | Ryu et al. |
| 2014/0272532 | A1 | 9/2014 | Park et al. |

(Continued)

FOREIGN PATENT DOCUMENTS

| KR | 20020011491 A | 2/2002 |
| KR | 100958649 B1 | 5/2010 |

(Continued)

OTHER PUBLICATIONS

Search report from International Application No. PCT/KR2016,007265, dated Oct. 12, 2016.

*Primary Examiner* — Matthew J Merkling
(74) *Attorney, Agent, or Firm* — Lerner, David, Littenberg, Krumholz & Mentlik, LLP

(57) ABSTRACT

The present invention relates to an electrode assembly. The electrode assembly comprises: a first separator sheet; and first and second electrode sheets respectively adhering to both sides of the first separator sheet, wherein both the surfaces of the first separator sheet have adhesion different from each other, the first electrode sheet adheres to a first surface, which has relatively high adhesion, of both the surfaces, and the second electrode sheet adheres to a second surface, which has relatively low adhesion, of both the surfaces.

5 Claims, 8 Drawing Sheets

(56) References Cited

U.S. PATENT DOCUMENTS

2015/0333308 A1  11/2015  Toyoda et al.
2016/0301055 A1  10/2016  Lee et al.

FOREIGN PATENT DOCUMENTS

| KR | 20120111078 A | 10/2012 |
|----|---------------|---------|
| KR | 20120134663 A | 12/2012 |
| KR | 20140065053 A | 5/2014  |
| KR | 20150005178 A | 1/2015  |

ELECTRODE ASSEMBLY AND METHOD FOR MANUFACTURING THE SAME

CROSS-REFERENCE TO RELATED APPLICATIONS

This application is a divisional of U.S. Application Ser. No. 15/549,546, filed Aug. 8, 2017, which is a national phase entry under 35 U.S.C. § 371 of International Application No. PCT/KR2016/007265, filed Jul. 5, 2016, which claims priority from Korean Patent Application No. 10-2015-0098563, filed on Jul. 10, 2015, the disclosures of which are incorporated herein by reference.

TECHNICAL FIELD

The present invention relates to an electrode assembly and a method for manufacturing the same, and more particularly, an electrode assembly, which is improved in adhesive property while minimizing adhesion between a positive electrode and a separator, and a method for manufacturing the same.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

DISCLOSURE OF THE INVENTION

Technical Problem

The secondary battery according to the related art comprises an electrode assembly. The electrode assembly has a structure in which a positive electrode, a separator, and a negative electrode are laminated.

That is, in the secondary battery according to the related art, the positive electrode and the negative electrode are respectively disposed on top and bottom surfaces of the separator and then laminated by using a pressure and folded to manufacture the electrode assembly.

However, the secondary battery according to the related art has a problem in securing the electrode assembly having the uniform quality due to a deviation in adhesion of the positive electrode and the negative electrode when the positive electrode and the negative electrode adhere to the separator under the same condition because the positive electrode has adhesion greater than that of the negative electrode.

The present invention has been made to solve the above-mentioned problem, and an object of the present invention is to an electrode assembly, in which the surface adhesion of the separator, which adheres to the positive electrode, is minimized to uniformly adjust the adhesion of the positive electrode and the negative electrode, and thereby to secure the uniform quality, and a method for manufacturing the same.

Technical Solution

To achieve the above-described objects, an electrode assembly comprises: a first separator sheet; and first and second electrode sheets respectively adhering to both sides of the first separator sheet, wherein both the surfaces of the first separator sheet have adhesion different from each other, the first electrode sheet adheres to a first surface, which has relatively high adhesion, of both the surfaces, and the second electrode sheet adheres to a second surface, which has relatively low adhesion, of both the surfaces.

Both the surfaces of the first separator sheet may be activated in adhesion through plasma treatment, and the second surface may be relatively weakly plasma-treated compared to the first surface.

Only the first surface of the first separator sheet may be activated in adhesion through plasma treatment.

A binder coating layer may be disposed on each of both the surfaces of the first separator sheet, and the binder coating layer having a thickness thinner than that of the binder coating layer disposed on the first surface may be disposed on the second surface.

The first separator sheet may be activated in adhesion by plasma-treating the binder coating layer.

The second surface may be relatively weakly plasma-treated compared to the first surface.

The first electrode sheet may be a negative electrode, and the second electrode sheet may be a positive electrode.

The radical unit may be wound in a jelly-roll shape.

The electrode assembly may further comprise a second separator sheet adhering to one of the first electrode sheet and the second electrode sheet, and the second separator sheet may be activated in adhesion by plasma-treating a surface of the second separator sheet, which adheres to the radical unit.

A method for an electrode assembly according to the present invention comprises: a step (S10) of manufacturing a first separator sheet so that both surfaces of the first separator sheet have adhesion different from each other; a step (S20) of disposing a first electrode sheet on a first surface, which has relatively high adhesion, of both the surfaces of the first separator sheet and a second electrode sheet on a second surface, which has relatively low adhesion, of both the surfaces of the first separator sheet; and a step (S30) of applying heat and a pressure to allow the first and second electrode sheets to adhere to both the surfaces of the first separator sheet and thereby to manufacture a radical unit.

In the step (S10), both the surfaces of the first separator sheet may be plasma-treated to be activated in adhesion, and the second surface may be relatively weakly plasma-treated compared to the first surface.

In the step (S10), only the first surface may be selectively plasma-treated.

In the step (S10), a binder coating layer may be formed on each of both the surfaces of the first separator sheet, and the binder coating layer having a thickness thinner than that of the binder coating layer formed on the first surface may be formed on the second surface.

After the step (S30), the method may further comprise a step (S40) of applying heat and a pressure to allow a second separator sheet to adhere to the second electrode sheet of the radical unit and winding the radical unit to manufacture the electrode assembly.

Advantageous Effects

The present invention has effects as follows.

First: the adhesion on both the surfaces of the first separator sheet may be differently applied to adjust the adhesion of the first electrode sheet and the second electrode sheet, thereby improving the quality of the electrode assembly.

Second: the plasma applied to the first and second surfaces of the first separator sheet may vary to differently apply the adhesion on both the surfaces of the first separator sheet.

Third: only the first surface of the first separator sheet may be plasma-treated to be activated and thereby to differently apply the adhesion on both the surfaces of the first separator sheet.

Fourth: the binder coating layer applied to both the surfaces of the first separator sheet may vary in thickness to differently apply the adhesion on both the surfaces of the first separator sheet.

MODE FOR CARRYING OUT THE INVENTION

Figure 1:
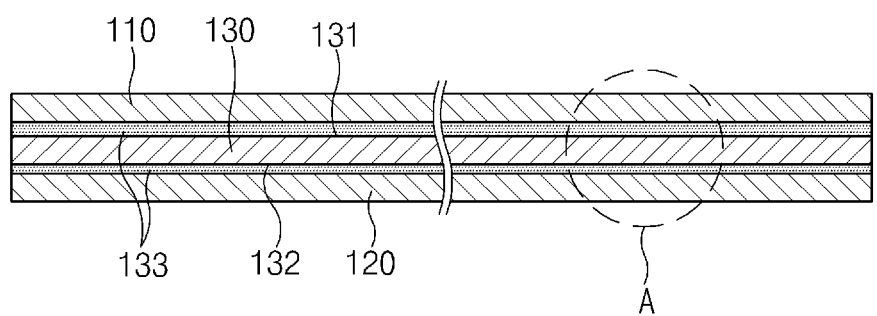
FIG. 1 is a view of an electrode assembly according to the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

As illustrated in FIG. 1, an electrode assembly 100 according to the present invention comprises a first separator sheet 130 and first and second electrode sheets 110 and 120 respectively adhering to both surfaces, i.e., top and bottom surfaces of the first separator sheet 130 when viewed in FIG. 1. Here, the first electrode sheet 110 is a negative electrode, and the second electrode sheet 120 is a positive electrode.

In the electrode assembly 100, the second separator sheet 112 that is the positive electrode has adhesion greater than that of the first electrode sheet 110 that is the negative electrode. Thus, when the first and second electrode sheets 110 and 120 respectively adhere to both the surfaces of the first separator sheet 130 with the same adhesion, since the adhesion of the second electrode sheet 120 is excessively greater than that of the first electrode sheet 110, a factor that hinders interfacial adhesion may occur.

To solve the above-described problem, the electrode assembly 100 according to the present invention may uniformly adjust the adhesion of the first electrode sheet 110 and the second electrode sheet 120 through the first separator sheet 130 having different adhesion on both surfaces thereof. That is, both the surfaces of the first separator sheet 130 have adhesion different from each other. Here, the first electrode sheet 110 adheres to a first surface 131, which has relatively high adhesion, of both the surfaces of the first separator sheet 130, and the second electrode sheet 120 adheres to a second surface 132, which has relatively low adhesion.

That is to say, the second surface 132 of the first separator sheet 130, which adheres to the second electrode sheet 120, may be lowered in adhesion to uniformly adjust the adhesion of the first and second electrode sheets 110 and 120.

Figure 5:
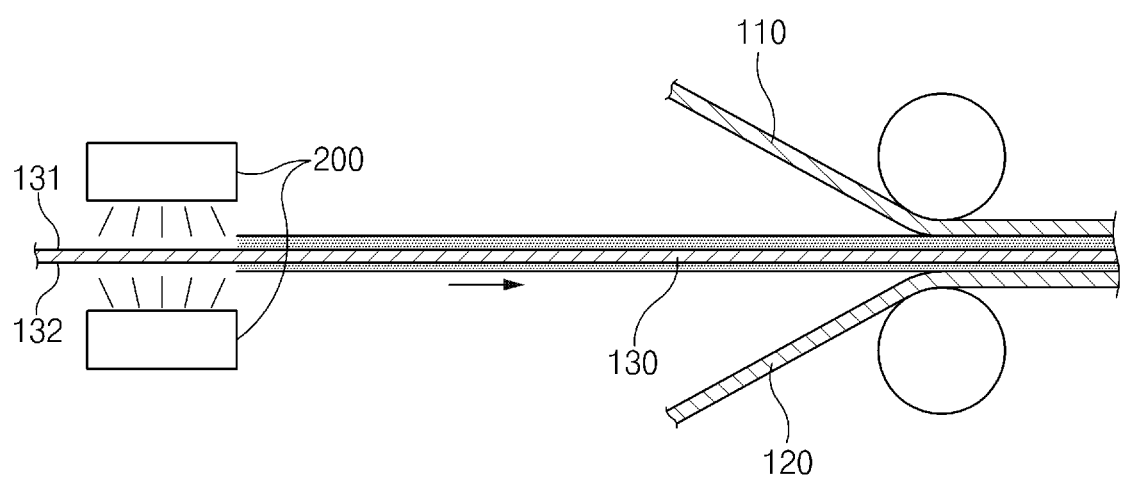
FIG. 5 is a view illustrating a state of manufacturing a first separator sheet according to a first embodiment of the present invention.

Referring to FIG. 5, in the electrode assembly 100 according to a first embodiment, both the surfaces of the first separator sheet 130 may be activated in adhesion through plasma treatment using a plasma device 200. Here, the second surface 132 may be relatively weakly plasma-treated compared to the first surface 131 so that the second surface 132 has adhesion less than that of the first surface 131.

As described above, since the second electrode sheet 120 adheres to the second surface 132 that is relatively weakly plasma-treated, and the first electrode sheet 110 adheres to the first surface 131 that is relatively strongly plasma-treated, the first and second electrode sheets 110 and 120 may be uniformly adjusted in adhesion.

Figure 6:
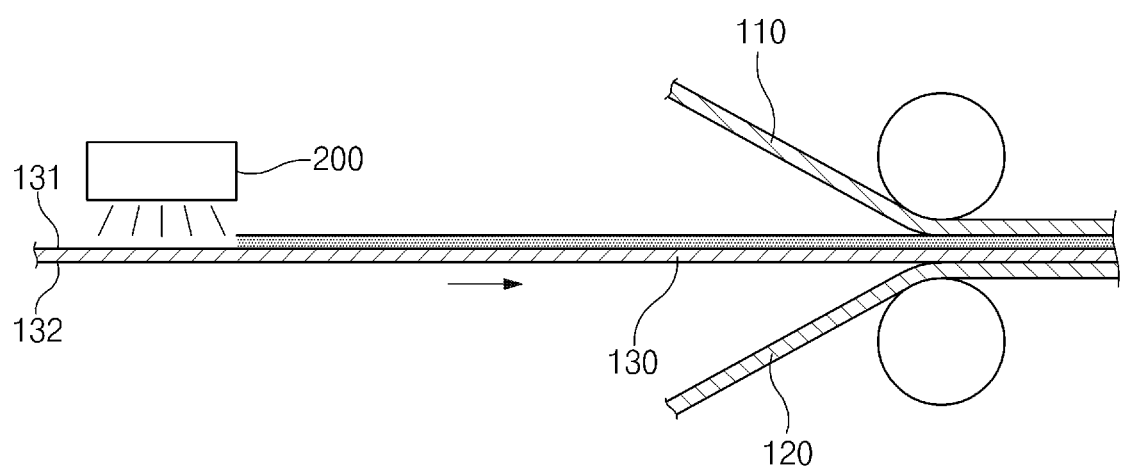
FIG. 6 is a view illustrating a state of manufacturing a first separator sheet according to a second embodiment of the present invention.

Referring to FIG. 6, in the electrode assembly 100 according to a second embodiment, only the first surface 131 of the first separator sheet 130 is plasma-treated to be activated in adhesion. That is, since the first surface 131 is plasma-treated to have adhesion greater than that of the second surface 132, the first and second electrode sheets 110 and 120 may be uniformly adjusted in adhesion.

Figure 2:
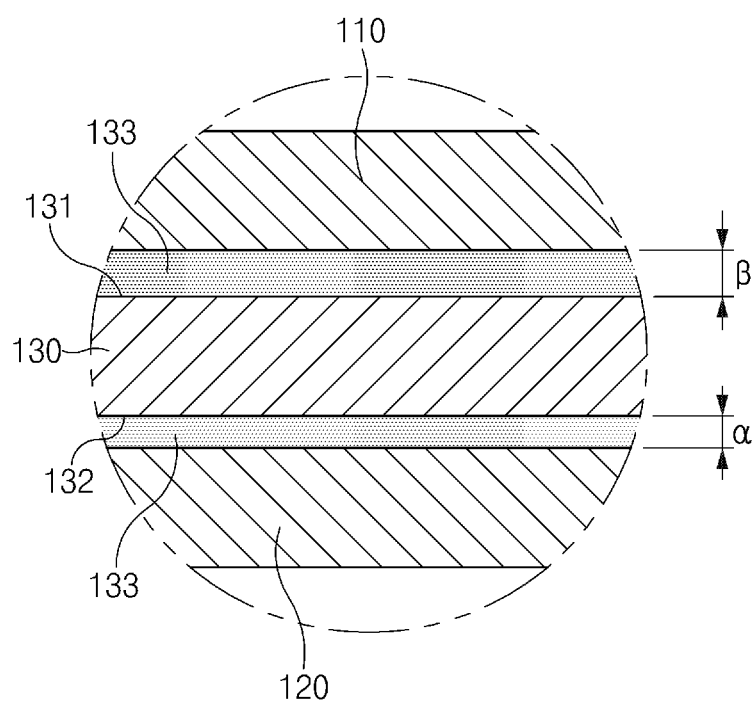
FIG. 2 is an enlarged view of a portion 'A' illustrated in FIG. 1.
Figure 3:
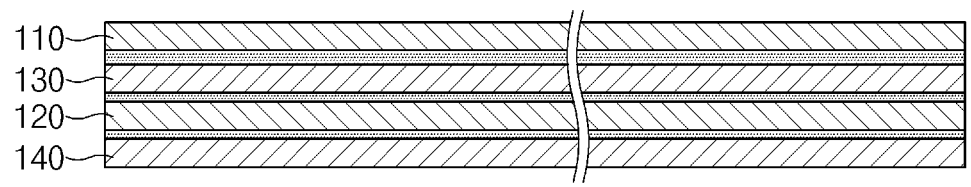
FIG. 3 is a view of the electrode assembly comprising a second separator sheet according to the present invention.
Figure 7:
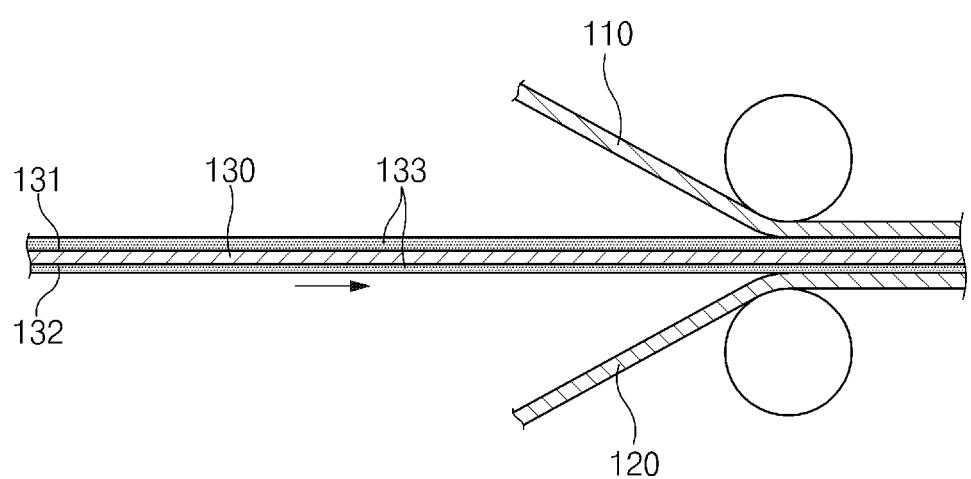
FIG. 7 is a view illustrating a state of manufacturing a first separator sheet according to a third embodiment of the present invention.

Referring to FIGS. 2 and 7, in the electrode 100 according to a third embodiment, a binder coating layer 133 is formed on each of the first and second surfaces 131 and 132 that are both the surfaces of the first separator sheet 130. Here, the binder coating layer 133 having a thickness thinner than that of the binder coating layer 133 disposed on the first surface 131 may be formed on the second surface 132. That is, the binder coating layer 133 on the first surface 131 has a thickness 'α' that is greater than that 'β' of the binder coating layer on the second surface 132. (see FIG. 2)

As described above, the first and second surfaces 131 and 132 may be adjusted in adhesion by using a deviation in thickness of the binder coating layer 133 having adhesion. That is to say, the binder coating layer 133 applied to the first surface 131 may have a thickness greater than that of the binder coating layer 133 applied to the second surface 132 to uniformly adjust the adhesion of the first and second electrode sheets 110 and 120, which respectively adhere to both the surfaces of the first separator sheet 130.

Here, the binder coating layer 133 applied to each of both the surfaces of the first separator sheet 130 may be plasma-treated to be activated, and thus, the binder coating layer 133 may increase in coating force.

The second surface 132 coated with the binder coating layer 133 having a relatively thin thickness may be more weakly plasma-treated compared to the first surface 131. Thus, a deviation in adhesion of the first and second surfaces 131 and 132 may be more clearly definitized to uniformly adjust the adhesion of the first and second electrode sheets 110 and 120.

Here, the electrode assembly 100 according to the present invention further comprises a second separator sheet 140 adhering to one outer surface of the first or second electrode sheets 110 and 120.

Figure 4:
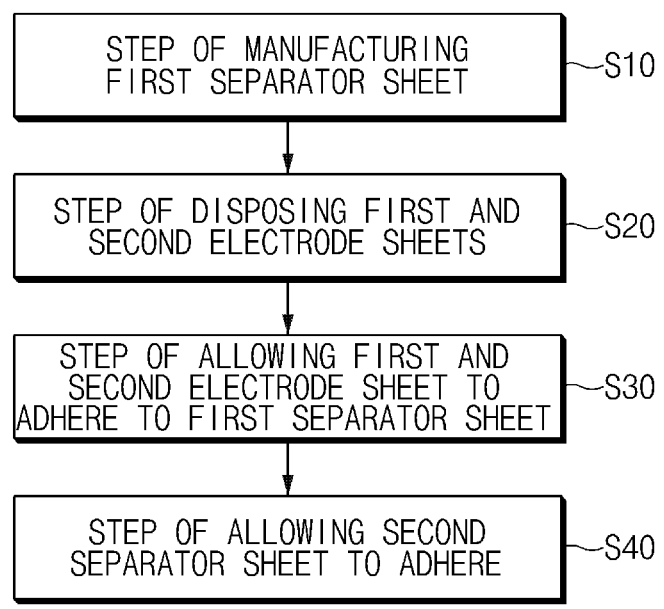
FIG. 4 is a flowchart illustrating a method for manufacturing the electrode assembly according to the present invention.

That is, the electrode assembly 100 has to comprise the second separator sheet 140 on the outermost portion thereof so that the electrode assembly 100 is wound to be manufactured in a jelly-roll shape. As illustrated in FIG. 4, the second separator sheet 140 adheres to a lower portion of the second electrode sheet 120, and thus, the electrode assembly 100 has a structure in which the first electrode sheet 110, the first separator sheet 130, the second electrode sheet 120, and the second separator sheet 140 are laminated. As a result, the electrode assembly 100 is wound to be manufactured in the jelly-roll shape.

The surface of the second separator sheet 140, which adheres to the first or second electrode sheet 110 or 120, may be plasma-treated to be activated in adhesion and thereby to improve the adhesion of the electrode sheet adhering to the second separator sheet 140.

Here, when the second separator sheet 140 adheres to an outer surface of the second electrode sheet 120, the adhesion surface of the second separator sheet 140 and the second surface 132 of the first separator sheet 130 may have the same adhesion, and thus both surface of the second electrode sheet 120 may be uniformly adjusted in adhesion.

Also, when the first separator sheet 140 adheres to an outer surface of the first electrode sheet 110, the adhesion surface of the second separator sheet 140 and the first surface 131 of the first separator sheet 130 may have the same adhesion, and thus both surface of the first electrode sheet 111 may be uniformly adjusted in adhesion.

A method for manufacturing the electrode assembly comprising the above-described constituents will be described below.

A method for manufacturing the electrode assembly according to the present invention comprises a step (S10) of manufacturing a first separator sheet 130 so that both surfaces of the first separator sheet 130 have adhesion different from each other, a step (S20) of disposing a first electrode sheet 110 and a second electrode sheet 120 on both the surfaces of the first separator sheet 130, and a step (S30) of allowing the first electrode sheet 110 and the second electrode sheet 120 to adhere to both the surfaces of the first separator sheet 130. The unfinished electrode assembly is wound in a jelly-roll shape to manufacture a finished electrode assembly 100.

In operation S10, both the surfaces of the first separator sheet 130 have adhesion different from each other.

As illustrated in FIG. 5, in a first method, both the surfaces of the first separator sheet 130 are plasma-treated to be activated in adhesion. Here, the second surface 132 is more weakly plasma-treated compared to the first surface 131, and thus the second surface 132 has adhesion less than that of the first surface 132.

That is, the first surface 131 having the high adhesion may adhere to the first electrode sheet 110 having the low adhesion, which is a negative electrode, and the second surface 132 having the low adhesion may adhere to the second electrode sheet 120 having the high adhesion, which is a positive electrode. Thus, the first electrode sheet 110 and the second electrode sheet 120 may be uniformly adjusted in adhesion.

As illustrated in FIG. 6, in a second method, only the first surface 131 of both the surfaces of the first separator sheet 130 may be selectively plasma-treated to be activated in adhesion, and thus the second surface 132 may have adhesion less than that of the first surface 132. As a result, the first electrode sheet 110 and the second electrode sheet 120 may be uniformly adjusted in adhesion.

As illustrated in FIG. 7, in a third method, a binder coating layer 133 is formed on each of both the surfaces of the first separator sheet 130. Here, the binder coating layer 133 having a thickness less than that formed on the first surface 131 is formed on the second surface 132. That is, the second surface 132 may have the adhesion less than that of the first surface 131 by using a difference in thickness of the binder coating layers 133 having the adhesion, and thus, the first electrode sheet 110 and the second electrode sheet 120 may be uniformly adjusted in adhesion.

In operation S20, the first electrode sheet 110 is disposed on the first surface 131, which has the relatively high adhesion, of both the surfaces of the first separator sheet 130, and the second electrode sheet 120 is disposed on the second surface 132, which has the relatively low adhesion, of both the surfaces of the first separator sheet 130.

In operation S30, the first and second electrode sheets 110 and 120 respectively adhere to both the surfaces of the first separator sheet 130 by applying heat and a pressure to manufacture an unfinished electrode assembly.

After the operation S30, a step (S40) of allowing the second separator sheet 140 to adhere to the outermost portion of the unfinished electrode assembly is performed.

Figure 8:
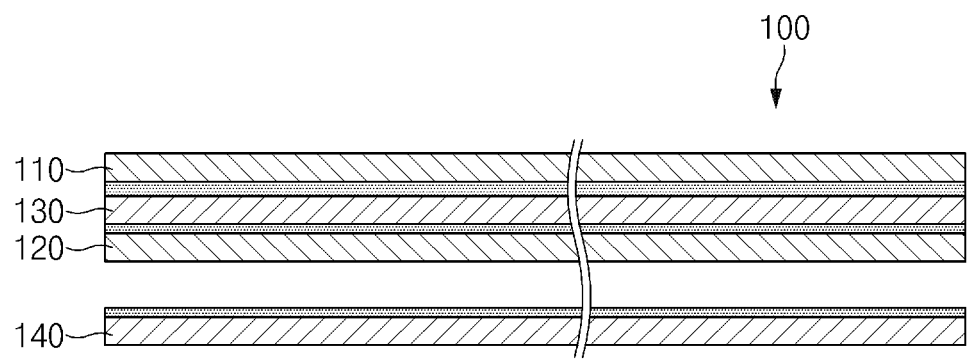
FIG. 8 is a view illustrating an adhering state of the second separator sheet according to the present invention.

In operation S40, as illustrated in FIG. 8, the second separator sheet 140 adheres to the second electrode sheet 120 of the unfinished electrode assembly 120 by applying heat and a pressure, and then the unfinished electrode assembly is wound in a jelly-roll shape to manufacture the electrode assembly. Here, an adhesion surface of the second separator sheet 140 has the same adhesion as the second surface 132 of the first separator sheet 130.

Thus, in the electrode assembly according to the present invention, the first electrode sheet 110 and the second electrode sheet 120 may respectively adhere to both the surfaces of the separator, which have adhesion different from each other, to uniformly adjust the adhesion of the first and second electrode sheets 110 and 120, thereby improving quality.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A method for an electrode assembly comprising:
  a step (S10) of manufacturing a first separator sheet so that both surfaces of the first separator sheet have adhesion per unit area different from each other;
  a step (S20) of disposing a first electrode sheet on a first surface, which has relatively high adhesion per unit area, of both the surfaces of the first separator sheet and a second electrode sheet on a second surface, which has relatively low adhesion per unit area, of both the surfaces of the first separator sheet; and
  a step (S30) of applying heat and a pressure to allow the first and second electrode sheets to adhere to both the surfaces of the first separator sheet and thereby to manufacture a radical unit.

2. The method of claim 1, wherein, in the step (S10), both the surfaces of the first separator sheet are plasma-treated to be activated in adhesion, and the second surface is relatively weakly plasma-treated compared to the first surface.

3. The method of claim 1, wherein, in the step (S10), only the first surface is selectively plasma-treated.

4. The method of claim 1, wherein, in the step (S10), a binder coating layer is formed on each of both the surfaces of the first separator sheet, and the binder coating layer having a thickness thinner than that of the binder coating layer formed on the first surface is formed on the second surface.

5. The method of claim 1, after the step (S30), further comprising a step (S40) of applying heat and a pressure to allow a second separator sheet to adhere to the second electrode sheet of the radical unit and winding the radical unit to manufacture the electrode assembly.

* * * * *